United States Patent
Miller

[15] 3,703,730
[45] Nov. 28, 1972

[54] INTERLINING
[72] Inventor: Samuel E. Miller, Winnetka, Ill.
[73] Assignee: Quick Service Textiles, Inc., Chicago, Ill.
[22] Filed: Sept. 27, 1971
[21] Appl. No.: 183,972

[52] U.S. Cl. ................................................2/272
[51] Int. Cl. .........................................A41d 27/02
[58] Field of Search........2/272, 243 R, 243 A, 243 B; 161/51, 146, 148

[56] References Cited

UNITED STATES PATENTS

| | | | |
|---|---|---|---|
| 1,683,226 | 9/1928 | Zuck | 2/272 |
| 2,705,692 | 4/1955 | Petterson | 2/243 R X |
| 3,257,262 | 6/1966 | Epstein | 2/272 X |
| 3,464,876 | 9/1969 | Barb | 161/148 X |
| 3,598,689 | 8/1971 | Feffer et al. | 2/272 X |

FOREIGN PATENTS OR APPLICATIONS 1,435,991  3/1969  Germany.......................2/272

Primary Examiner—Alfred R. Guest
Attorney—Leonard S. Knox

[57] ABSTRACT

Textile interlinings having a stiffening function of the type comprising a fabric sub-strate carrying a myriad of closely spaced dots, usually of a fusible substance, e.g. a thermoplastic resin, whereby the interlining may be reliably secured to an adjacent fabric layer by application of heat and/or pressure. The invention relates to an improved arrangement of dots having a proportioned relation to the desired stiffness of the laminated sub-strate and interlining in selected area.

7 Claims, 3 Drawing Figures

PATENTED NOV 28 1972 3,703,730

INTERLINING

BACKGROUND OF THE INVENTION

Present-day interlining material designed to be laminated with another layer of fabric for stiffening and/or reinforcing garments, draperies and the like are well known. In one commercial form, a fusible resin, distributed as a myriad of closely spaced small dots, is employed to unite the two fabric layers. Consequently, since plural small areas of adhesion rather than a continuous film of adhesive are relied on, lamination of the interlining to the adjacent fabric is obtained without the boardy effect characteristic of an uninterrupted layer of adhesive.

According to present practice, these dots, or other form of surface application of the resin, are deposited on the sub-strate in the form of a paste in the following ways:

1. The so-called Smith and Nephew method in which a web of thermoplastic resin is prepared of dots joined by links. This web is fed together with and contiguous to the sub-strate and heat is applied. The dimensions of the links are such that, upon heat being applied, the softened substance of the links is drawn toward the dots by capillary attraction to increase the bulk thereof, and hence the adhesive action, without rendering the interlining boardy.

2. The sub-strate is traversed just above the surface of a reservoir containing the resin in flowable form. A bank of needles is reciprocated vertically to pass through the sub-strate and dip into the bath. Upon the return stroke, the resin adherent to the needles is stripped off and remains on the sub-strate as the required myriad of dots.

3. In "roller printing", a roller has etched depressions corresponding substantially with the ultimate shape of dots. The roller rotates partially submerged in a bath of resin which is pasty and a doctor blade strips the excess. The sub-strate is heated and traversed in contact with the roller, whereby the resin held in the depression is sucked on to the sub-strate by capillary attraction.

4. The sub-strate moves along the periphery of a rotating drum having perforations of the correct size in its lateral wall. The resin, of flowable consistency, is fed to the interior of the drum, while a doctor blade forces the same through the perforations on to the sub-strate.

5. A web of resin, e.g. as randomly dispersed fibers adherent at their intersections, is fed along with the sub-strate and pressed into adherence therewith by a roller or rollers. Heat may be applied to soften the web just prior to application of pressure.

6. The sintering method comprises random dispersion, e.g. by sprinkling, of particles of resin on to the heated sub-strate whereto the particles adhere.

An improved interlining and the method of making the same are disclosed in my co-pending application Ser. No. 179,334, filed Sept. 10, 1971, which is incorporated in the present specification by reference.

SUMMARY OF INVENTION

In accordance with the present invention, interlining is fabricated by applying to a fabric sub-strate a myriad of dots of a thermoplastic resin or other suitable substance capable of serving, when subjected to heat and/or pressure, of securing a suitably shaped piece of the interlining to a base fabric, e.g. the front of a suit coat. The invention does not depend per se on the substances used for the dots or the mode of adhering the interlining to its companion fabric, but relates to the distribution of the dots in an array which has a varying density per unit area, depending upon the relative stiffness to be imparted to the various regions.

Where, herein, I employ the term "dot," it is not intended thereby to limit the configuration of the same to a circular outline, and where I employ the term "myriad," it is not intended thereby to limit the configuration of the same to a circular outline, and where I employ the term "myriad," it is intended to convey the idea of a relatively large number of dots thereby, impliedly, referring to an arrangement lending itself to a proportioned variation in density. In lieu of dots in the generally accepted sense, the adhesive medium may take the form, among others, of a set of lines which are parallel or non-parallel or of two such sets intersecting each other. The term "sub-strate" is intended to refer to the fabric to which the dots are applied, e.g. percale.

Since, as previously mentioned, the dot distribution is reflected in various degrees of stiffness of the interlining which is, in turn, transferred to the companion fabric, the present invention comprehends a variable spacing of dots having a proportioned relation to the desired stiffness of the interlining at different zones. For example, interlining for the front of a man's suit coat is preferably stiffer over the chest than at the bottom.

DESCRIPTION OF THE PREFERRED EMBODIMENT

Figure 1:
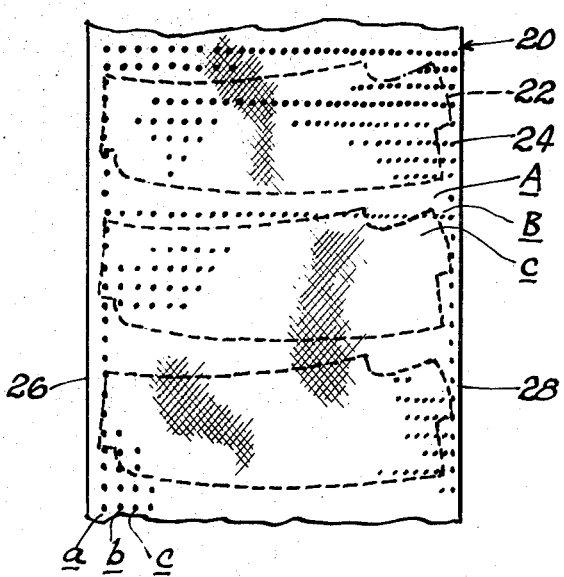
FIG. 1 illustrates a web of sub-strate with the dots arranged thereon in a proportioned manner, wherefrom coat-front pieces may be cut therefrom crosswise.

Adverting to FIG. 1, there is shown a length of sub-strate 20 of any fabric conventionally used for interlining, e.g. percale, and superimposed thereon in phantom are several outlines 22, along which the fabric will be cut to yield pieces to be incorporated in one side of a coat front. It will be understood that interlining is used in many applications, and that the example is typical of one in which the stiffness imparted to the shell fabric is desirably proportioned from a greater stiffness over the chest to a lesser stiffness at the bottom.

To this end and in accordance with the invention, the dots 24 are arranged in equally spaced rows A, B, C, etc. along the length of the fabric and in columns $a$, $b$, $c$, etc. transversely of the fabric. However, these columns are of graduated spacing from a maximum at the left margin 26, to a minimum at the right margin 28. Assuming uniform dot size, the result will be a greater density of dots at the right than at the left, i.e. the dot distribution has maximum density at the right, and minimum density at the left. In this way, the interlining, when attached to the shell of the coat front, will result in maximum stiffness of the composite in the chest region and minimum stiffness at the bottom.

Alternatively, the rows A, B, C, etc. may be non-uniformly spaced to obtain a density of dots which varies in the other direction also, i.e. as one progresses from one side of the garment to the other, i.e. in a vertical direction as seen in the figure. To enable a clearer understanding, it is to be noted that, in one commercial form of interlining, there are approximately 350 dots per square inch, and that each dot has a substantially circular aspect of about 1/32 inch diameter. The size and spacing of the dots in the drawing are exaggerated for clarity.

In a broad sense, the invention contemplates a distribution of the dots to obtain any desired stiffness over any desired zones of the ultimate outline of the piece of interlining. In this respect, the invention is independent of the magnitude, configuration or material comprising the dots. However, for special applications, these parameters may be varied along with or independently of the spacing of the dots.

Figure 2:
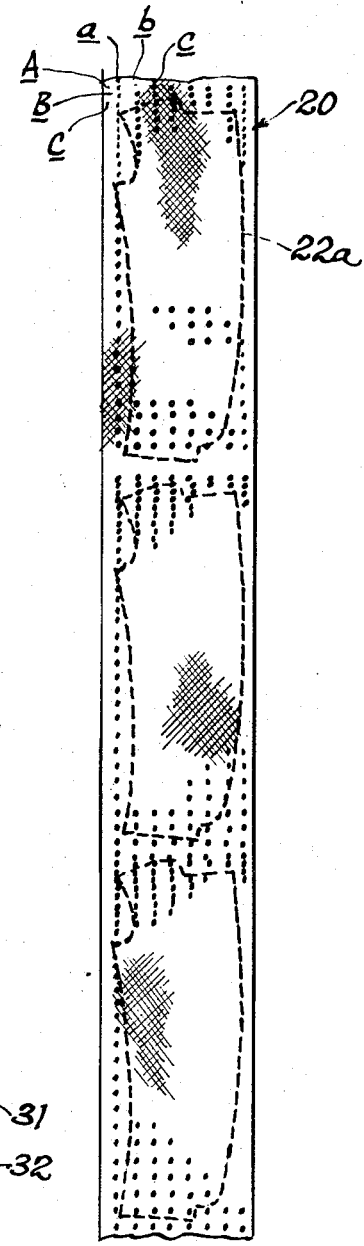
FIG. 2 is a view similar to FIG. 1, but with the dots arranged for cutting coat-front pieces therefrom lengthwise.

FIG. 2 is similar to FIG. 1, except that, in this embodiment, the pieces 22a are cut from the fabric 20a in the lengthwise direction. In this case, the columns and rows of FIG. 1 are obviously interchanged and are indicated by the same reference letters. Otherwise, the description will be clear from what has preceded.

Figure 3:
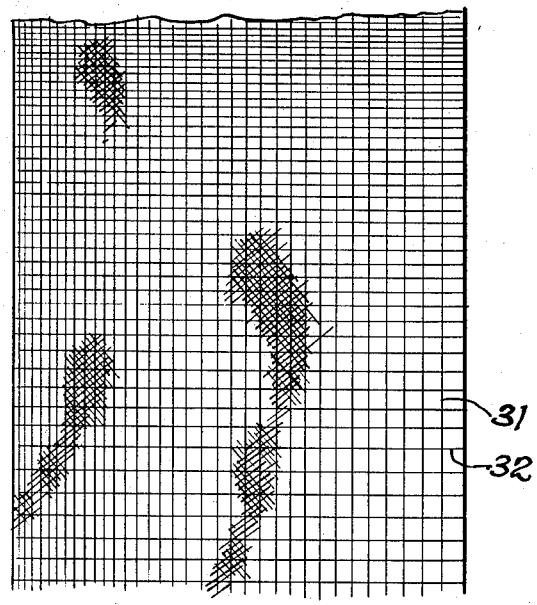
FIG. 3 is a view showing a different pattern of "dot," namely, lines of the adhesive medium.

An alternative is shown in FIG. 3, wherein the dots are replaced by stripes of adhesive 31 lengthwise of the fabric and stripes 32 transversely thereof. By providing closer spacing of the stripes at the regions where greater density is required and vice verse, the advantages pointed out in connection with FIG. 1 may be realized. It will be understood that the stripes 31 may be spaced uniformly and the stripes 32 spaced non-uniformly to obtain specialized characteristics, or vice versa. If desired, the stripes may be combined with circular dots.

I claim:

1. Fusible interlining for assembly with a fabric forming part of a garment to impart various degrees of stiffness in selected areas of the fabric comprising a sub-strate, a plurality of dots capable of acting as an adhesive between the interlining and fabric and carried on the sub-strate, the distribution of the dots having greatest density in areas of maximum stiffness and lease density in the areas of minimum stiffness.

2. Interlining in accordance with claim 1, wherein the dots are essentially circular areas applied to the sub-strate.

3. Fusible interlining for assembly with a fabric forming part of a garment to impart various degrees of stiffness in selected areas of said fabric comprising a sub-strate, a plurality of spaced-apart stripes of material capable of acting as an adhesive between the interlining and fabric and carried on the sub-strate, said spacing being closer at a region of greater stiffness and farther apart at a region of lesser stiffness.

4. Interlining in accordance with claim 3 further characterized by a second plurality of spaced stripes intersecting said first plurality.

5. Interlining in accordance with claim 4 further characterized in that the spacing of the second plurality is closer at a region of greater stiffness and farther apart at a region of lesser stiffness.

6. Interlining having an outline to conform to a front portion of a suit coat, said interlining comprising a sub-strate and a myriad of dots of a substance capable of adhering the interlining to the shell fabric, said dots having greater density at those areas corresponding to the breast of the coat and lesser density elsewhere.

7. Fusible interlining comprising a textile sub-strate and a plurality of discrete dots carried on the sub-strate, the density of the dots being varied over the extent of the sub-strate in proportion to the stiffness of the interlining in various areas as determined by the end use, the greatest density being associated with the region of greatest stiffness and the least density being associated with the region of least stiffness.

* * * * *